US012248753B2

(12) United States Patent
Yao et al.

(10) Patent No.: US 12,248,753 B2
(45) Date of Patent: Mar. 11, 2025

(54) BRIDGING SEMANTICS BETWEEN WORDS AND DEFINITIONS VIA ALIGNING WORD SENSE INVENTORIES

(71) Applicant: TENCENT AMERICA LLC, Palo Alto, CA (US)

(72) Inventors: Wenlin Yao, Bellevue, WA (US); Xiaoman Pan, Bellevue, WA (US); Lifeng Jin, Bellevue, WA (US); Jianshu Chen, Woodinville, WA (US); Dian Yu, Bellevue, WA (US); Dong Yu, Bothell, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 362 days.

(21) Appl. No.: 17/508,417

(22) Filed: Oct. 22, 2021

(65) Prior Publication Data

US 2023/0132090 A1    Apr. 27, 2023

(51) Int. Cl.
*G06F 40/30* (2020.01)
*G06F 40/284* (2020.01)
*G06N 3/04* (2023.01)

(52) U.S. Cl.
CPC ............ *G06F 40/30* (2020.01); *G06F 40/284* (2020.01); *G06N 3/04* (2013.01)

(58) Field of Classification Search
CPC .......... G06F 40/30; G06F 40/284; G06N 3/04
See application file for complete search history.

(56) References Cited

U.S. PATENT DOCUMENTS

| 10,073,843 B1 | 9/2018 | Seligman et al. |
| 2005/0080613 A1* | 4/2005 | Colledge ............... G06F 16/951 704/9 |
| 2009/0204386 A1* | 8/2009 | Seligman ................ G06F 40/58 704/2 |
| 2017/0083484 A1 | 3/2017 | Patil et al. |
| 2020/0257712 A1 | 8/2020 | Singh et al. |
| 2023/0124168 A1* | 4/2023 | Malkiel ............... G06F 18/2178 382/112 |

OTHER PUBLICATIONS

International Search Report dated Dec. 28, 2022 in International Application No. PCT/US22/41308.
Written Opinion dated Dec. 28, 2022 in International Application No. PCT/US22/41308.

* cited by examiner

*Primary Examiner* — Pierre Louis Desir
*Assistant Examiner* — Daniel W Chung
(74) *Attorney, Agent, or Firm* — Sughrue Mion, PLLC

(57) ABSTRACT

There is included a method and apparatus comprising computer code configured to cause a processor or processors to perform generating one or more aligned inventories, wherein the one or more aligned inventories are generated using one or more word sense inventories, obtaining a word in a context sentence, determining one or more semantic equivalence scores indicating semantic similarity between the word in the context sentence and each of one or more associated glosses in the one or more aligned inventories using a semantic equivalence recognizer model, and predicting a correct sense of the word in the context sentence based on the determined one or more semantic equivalence scores.

18 Claims, 7 Drawing Sheets

BRIDGING SEMANTICS BETWEEN WORDS AND DEFINITIONS VIA ALIGNING WORD SENSE INVENTORIES

FIELD

Embodiments of the present disclosure are directed to the field of Natural Language Processing (NLP), more specifically Word Sense Disambiguation (WSD) that aims to automatically understand the exact meaning of a word in the context of the word's use in a sentence or expressions.

BACKGROUND

Human Languages are ambiguous in a way because a word can have multiple meanings in different contexts. WSD aims to automatically identify the exact meaning of a word in the context of the word's use, usually a context sentence. The identification of the correct meaning of the word in its context is essential to many downstream tasks such as machine translation, information extraction, and other tasks in natural language processing.

One of the problems solved by the present disclosure is the struggle supervised models face when attempting to predict the correct meaning for rare word senses because of limited training data on those rare word senses. Since most models predict the meaning of a word based on training from a pre-defined word sense inventory, rare words that do not occur or occur very infrequently are usually overlooked when predicting the meaning of a word.

Many approaches include fine-tuning language models with massive text data on task specific datasets. However, those approaches often limit the applicability of the trained models and cause major problems. Firstly, the models' performance decreases significantly when predicting rare and zero-shot word sense because of insufficient samples in the training data. Another problem is that task specific fine-tuning of models often renders the models inventory dependent wherein they can only select the best definition form one predefined word sense inventory (e.g., WordNet) and not more generally.

SUMMARY

The present disclosure addresses one or more technical problems. To address the problem of correctly predicting the meaning of rare word sense, i.e., the data sparsity problem, and generalize the model to be independent of one pre-defined inventory, the present disclosure proposes a gloss alignment algorithm that aligns glosses with the same meaning from different word sense inventories to collect rich lexical knowledge. Training or fine-tuning the model to identify semantic equivalence between a word in context and one of its glosses using these aligned inventories addresses the data sparsity and generalization problems, with improved predictions on both frequent and rare word senses.

Embodiments of the disclosure provide a method and an apparatus for predicting a word sense.

According to one aspect of the disclosure, a method for predicting a word sense, the method includes generating one or more aligned inventories, wherein the one or more aligned inventories are generated using one or more word sense inventories; obtaining a word in a context sentence; determining one or more semantic equivalence scores indicating semantic similarity between the word in the context sentence and each of one or more associated glosses in the one or more aligned inventories using a semantic equivalence recognizer model; and predicting a correct sense of the word in the context sentence based on the determined one or more semantic equivalence scores.

According to an aspect of the disclosure, the generation of the one or more aligned inventories includes collecting glosses from a first word sense inventory; collecting glosses from a second word sense inventory; determining a best match between the first word sense inventory and the second word sense inventory, wherein the determining of the best match between the first word sense inventory and the second word sense inventory includes for each common word in the first word sense inventory and the second word sense inventory, determining a sentence textual similarity score between each gloss from the first word sense inventory and each of one or more associated glosses from the second word sense inventory; and determining a matching function to map the each gloss from the first word sense inventory to the each of the one or more associated glosses from the second word sense inventory, wherein the matching function is configured to maximize a sum of the sentence textual similarity score between the each gloss from the first word sense inventory and the each of the one or more associated glosses from the second word sense inventory;

According to an aspect of the disclosure, the generation of the one or more aligned inventories further includes generating positive gloss pairs by pairing a gloss from the first word sense inventory with the each of the one or more associated glosses from the second word sense inventory based on determining that the sentence textual similarity score between the gloss from the first word sense inventory and the each of the one or more associated glosses from the second word sense inventory is above a threshold; and generating negative gloss pairs by pairing a gloss from the first word sense inventory with the each of the one or more associated glosses from the second word sense inventory based on determining that the sentence textual similarity score between the gloss from the first word sense inventory and the each of the one or more associated glosses from the second word sense inventory is below the threshold.

According to an aspect of the disclosure, determining the sentence textual similarity score between the each gloss from the first word sense inventory and the each of the one or more associated glosses from the second word sense inventory includes determining one or more sentence embeddings based on a secondary pre-trained model; and determining a cosine similarity between the each gloss from the first word sense inventory and the each of the one or more associated glosses from the second word sense inventory based on the one or more sentence embeddings.

According to an aspect of the disclosure, the secondary pre-trained model includes a Sentence Bidirectional Encoder Representations from Transformers (SBERT) model.

According to an aspect of the disclosure, the determining of the one or more semantic equivalence scores indicating the semantic similarity between the word in the context sentence and the each of the one or more associated glosses in the one or more aligned inventories using the semantic equivalence recognizer model includes inputting the word in the context sentence into the semantic equivalence recognizer model; inputting the one or more aligned inventories into the semantic equivalence recognizer model; identifying one or more glosses from the one or more aligned inventories associated with the word in the context sentence; and applying a trained gloss classifier to the identified one or more glosses to generate a probability score for each of the identified one or more glosses.

According to an aspect of the disclosure, the trained gloss classifier is trained using an augmented training data, wherein the augmented training data is a combination of the one or more aligned inventories and built-in training data associated with a specific word sense inventory.

According to an aspect of the disclosure, the trained gloss classifier is trained using the one or more aligned inventories and the trained gloss classifier is fine-tuned using built-in training data associated with a specific word sense inventory in a new domain.

According to an aspect of the disclosure, the one or more word sense inventories is a lexical dataset for a language.

According to an aspect of the disclosure, the predicting of the correct sense of the word in the context sentence based on the determined one or more semantic equivalence scores includes selecting a result gloss associated with a highest semantic equivalence score.

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
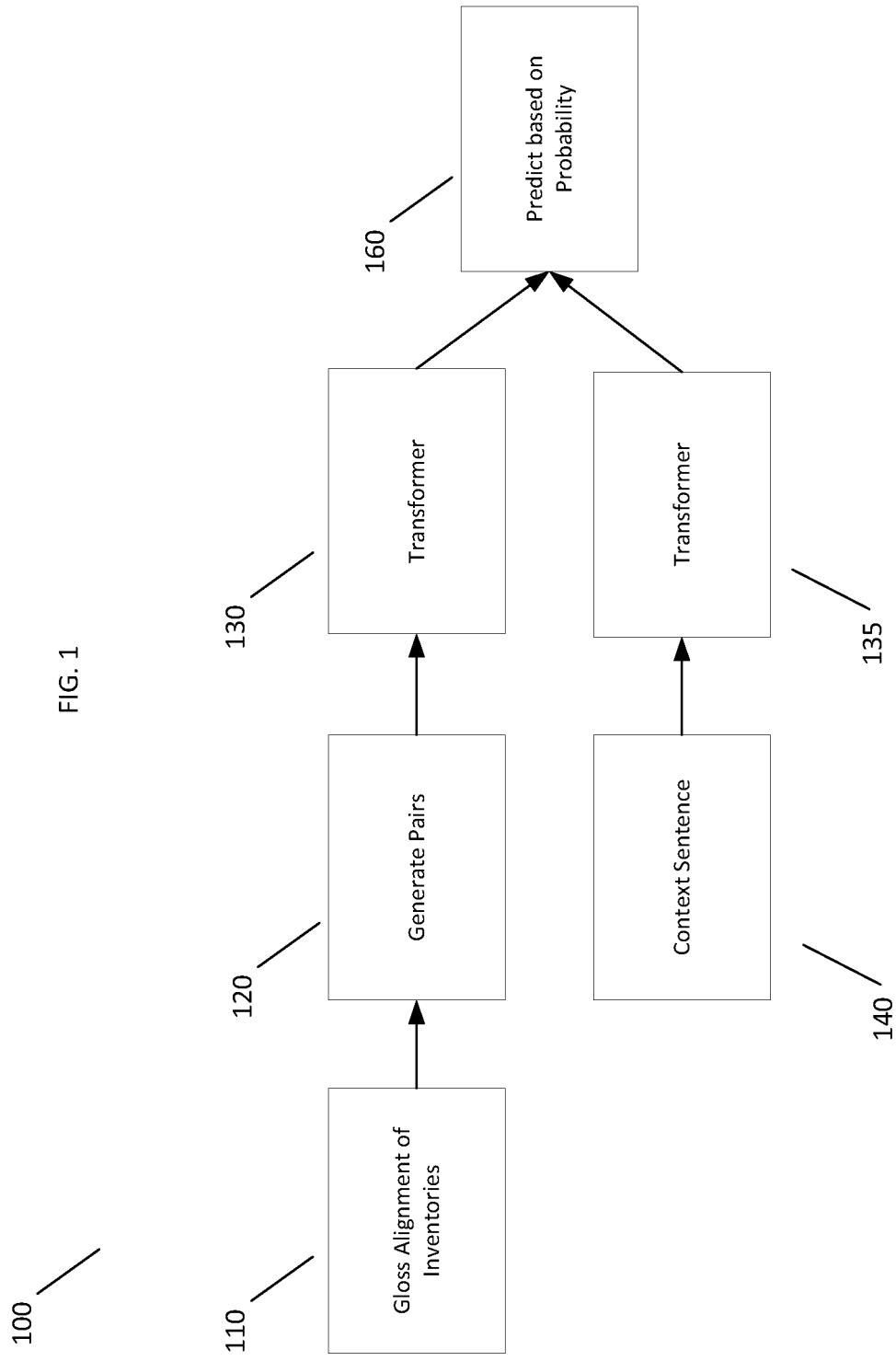
FIG. 1 is a simplified block diagram of a word sense predicting model according to embodiments of the disclosure.

FIG. 1 is a simplified diagram of a word sense predicting model 100 according to embodiments. The word sense predicting model 100 may predict whether a word in the context sentence and a gloss are semantically equivalent or not. Thus, the word sense predicting model 100 predicts the meaning of a word sense in the context sentence.

At operation 110, gloss alignment of word sense inventories may align a plurality of word sense inventories to produce a best mapping or best matching alignment of glosses from across a plurality of word sense inventories. To leverage the lexical and contextual information from the plurality of word sense inventories, the gloss alignment or alignment of inventories may include a best matching function that includes a mapping of glosses of common words from one of the word sense inventories to the glosses of another one of the word sense inventories such that the mappings in the matching function may have maximum sentence textual similarity.

At operation 120, pairs of glosses may be generated, wherein the pairs of glosses may include each mapping of glosses of common words from one of the word sense inventories to the glosses of another one of the word sense inventories. In some embodiments, the mappings where the pair of glosses may be aligned, i.e., both the glosses in the pair may have a high sentence textual similarity may be labelled as positive pairs of glosses. In some embodiments, the mappings where the pair of glosses may not be aligned, i.e., both the glosses in the pair may have a low sentence textual similarity may be labelled as negative pairs of glosses. In some embodiments, only pairs that have sentence textual similarities above a threshold may be considered to improve the quality of supervision and training. In some embodiments, pairs of glosses may be generated using glosses within each word sense inventory individually. Thus, in some embodiments, for every word in a word sense inventory, a gloss sentence may be paired with an example sentence to get positive pairs of glosses. Similarly, in some embodiments, for every word in a word sense inventory, a gloss sentence may be paired with an example sentence for another unassociated word to generate negative pairs of glosses.

At 140, the context sentence that contains the word whose sense is to be determined may be obtained. At 130 and 135, transformers may be used to train the model using training data. In some embodiments, transformers may be pre-trained and may be applied to the context sentence to generate a probability. At 160, the generated probability may be used to predict the correct sense of the word in the context sentence.

As an example, consider the evaluation of the word sense predicting model 100 using two WSD Datasets one that focuses on all-words WSD evaluation and another a Few Shot Examples of Word Senses (FEWS) that emphasizes low-shot evaluation to understand the word sense predicting model 100's performance in general word sense inventories and with data sparsity.

Both all-words WSD and FEWS datasets are annotated with WordNet 3.0. We may generate positive and negative pairs of glosses generated from the built-in training data from the specific datasets for training. We may also generate aligned inventories using one or more dictionaries that provide glosses with rich lexica knowledge. Generating aligned inventories may include generating positive and negative pairs of glosses from the one or more dictionaries.

In some embodiments, the word sense predicting model 100's transformers (130, 135) may be trained using augmented training data that combines the pairs of glosses from the aligned inventories and the pairs of glosses from the built-in training data from the specific datasets. The augmented model (SemEq-Base) may train using only the augmented training data.

In some embodiments, the word sense predicting model 100's transformers (130, 135) may be trained first using training data that includes only the pairs of glosses from the aligned inventories. Using only the pairs of glosses from the aligned inventories may generate a general model (SemEq-Large-General) that may determine whether a word in the context sentence and a gloss are semantically equivalent or not independent of any specific word sense inventories. In some embodiments, this general model is further trained or fine-tuned on the built-in training data for the specific word sense inventories to create an expert model (SemEq-Large- Expert). The expert model may adapt better to new domains and achieve better performance.

TABLE 1

| | | Model difference | | | Dev | Test | | | | Concatenation of all Datasets | | | | |
|---|---|---|---|---|---|---|---|---|---|---|---|---|---|---|
| Models | TS | IK | GS | MS | SE07 | SE2 | SE3 | SE13 | SE15 | Noun | Verb | Adj | Adv | ALL |
| 1 Most Frequent Sense | ✓ | — | — | — | 54.5 | 65.6 | 66.0 | 63.8 | 67.1 | 67.7 | 49.8 | 73.1 | 80.5 | 65.5 |
| 2 Lesk$_{emb}$ (2014) | ✓ | — | ✓ | — | 56.7 | 63.0 | 63.7 | 66.2 | 64.6 | 70.0 | 51.1 | 51.7 | 80.6 | 64.2 |
| 3 BiLSTM (2017a) | ✓ | — | — | — | — | 71.1 | 68.4 | 64.8 | 68.3 | 69.5 | 55.9 | 76.2 | 82.4 | 68.4 |
| 4 HCAN (2018a) | ✓ | — | — | — | — | 72.8 | 70.3 | 68.5 | 72.8 | 72.7 | 58.2 | 77.4 | 84.1 | 71.1 |
| 5 EWISE (2019) | ✓ | — | ✓ | — | 67.3 | 73.8 | 71.1 | 69.4 | 74.5 | 74.0 | 60.2 | 78.0 | 82.1 | 71.8 |
| 6 LMMS$_{BERT}$ (2019) | ✓ | — | ✓ | L | 68.1 | 76.3 | 75.6 | 75.1 | 77.0 | — | — | — | — | 75.4 |
| 7 GlossBERT (2019) | ✓ | — | — | B | 72.5 | 77.7 | 75.2 | 76.1 | 80.4 | 79.3 | 66.9 | 78.2 | 86.4 | 77.0 |
| 8 BEM (2020) | ✓ | — | — | B | 74.5 | 79.4 | 77.4 | 79.7 | 81.7 | 81.4 | 68.5 | 83.0 | 87.9 | 79.0 |
| 9 AdaptBERT$_{Large}$ (2020) | ✓ | S | — | L | 72.7 | 79.8 | 77.8 | 79.7 | 84.4 | 82.6 | 68.5 | 82.1 | 86.4 | 79.5 |
| 10 EWISER (2020) | ✓ | S | ✓ | L | 75.2 | 80.8 | 79.0 | 80.7 | 81.8 | 82.9 | 69.4 | 83.6 | 87.3 | 80.1 |
| 11 SemEq-Base | ✓ | — | — | B | 72.7 | 79.0 | 77.2 | 78.0 | 80.8 | 81.0 | 67.1 | 81.7 | 86.7 | 78.2 |
| | | | | | Ours: Data Augmentation | | | | | | | | | |
| 12 SemEq-Base | ✓ | M | — | B | 73.2 | 81.2 | 77.7 | 79.1 | 81.5 | 81.9 | 68.9 | 83.2 | 87.6 | 79.4 |
| | | | | | Ours: Transfer Learning | | | | | | | | | |
| 13 SemEq-Base-General | — | M | — | B | 65.7 | 75.3 | 70.9 | 78.0 | 79.8 | 78.2 | 61.3 | 81.2 | 80.3 | 74.8 |
| 14 SemEq-Base-Expert | ✓ | M | — | B | 74.1 | 81.0 | 78.5 | 79.9 | 82.6 | 82.5 | 69.9 | 82.5 | 88.4 | 79.9 |
| 15 SemEq-Large-General | — | M | — | L | 65.1 | 76.1 | 74.3 | 78.0 | 83.0 | 79.1 | 64.7 | 82.3 | 81.8 | 76.4 |
| 16 SemEq-Large-Expert | ✓ | M | — | L | 74.9 | 81.8 | 79.6 | 81.2 | 81.8 | 83.2 | 71.1 | 83.2 | 87.9 | 80.7 |

As Table 1 indicates, the expert model (SemEq-Large-Expert) (line 16) consistently outperforms AdaptBERT (line 9), the previous best model without using WordNet synset graph information, on SE07, SE2, SE3 and SE13, attaining 1.2% higher F1 on ALL. The expert model (SemEq-Large-Expert) also better disambiguates all types of words including nouns, verbs, adjectives, and adverbs than AdaptBERT. This demonstrates the benefits of leveraging multiple word sense inventories using gloss alignment and transfer learning. The expert model (SemEq-Large-Expert) is 0.6% more accurate when compared with EWISER (line 10) that uses the extra WordNet graph knowledge. Thus, by pre-training on lexical knowledge derived from aligned inventories, the word sense prediction model may generalize more easily and may better capture semantic equivalence between the word in the context statement and a gloss sentence for identifying the correct sense of the word.

inventories using gloss alignment (line 6) greatly improves zero-shot learning performance by 1.6% on the dev set and 2.4% on the test set (compared with line 5). When the transfer learning strategy is adopted on the FEWS dataset, the final SemEq-Large-Expert (line 10) model's performance on test sets increases to 82.3% on few-shot senses and 72.2% on zero-shot senses, which significantly outperforms all baseline models.

Figure 2:
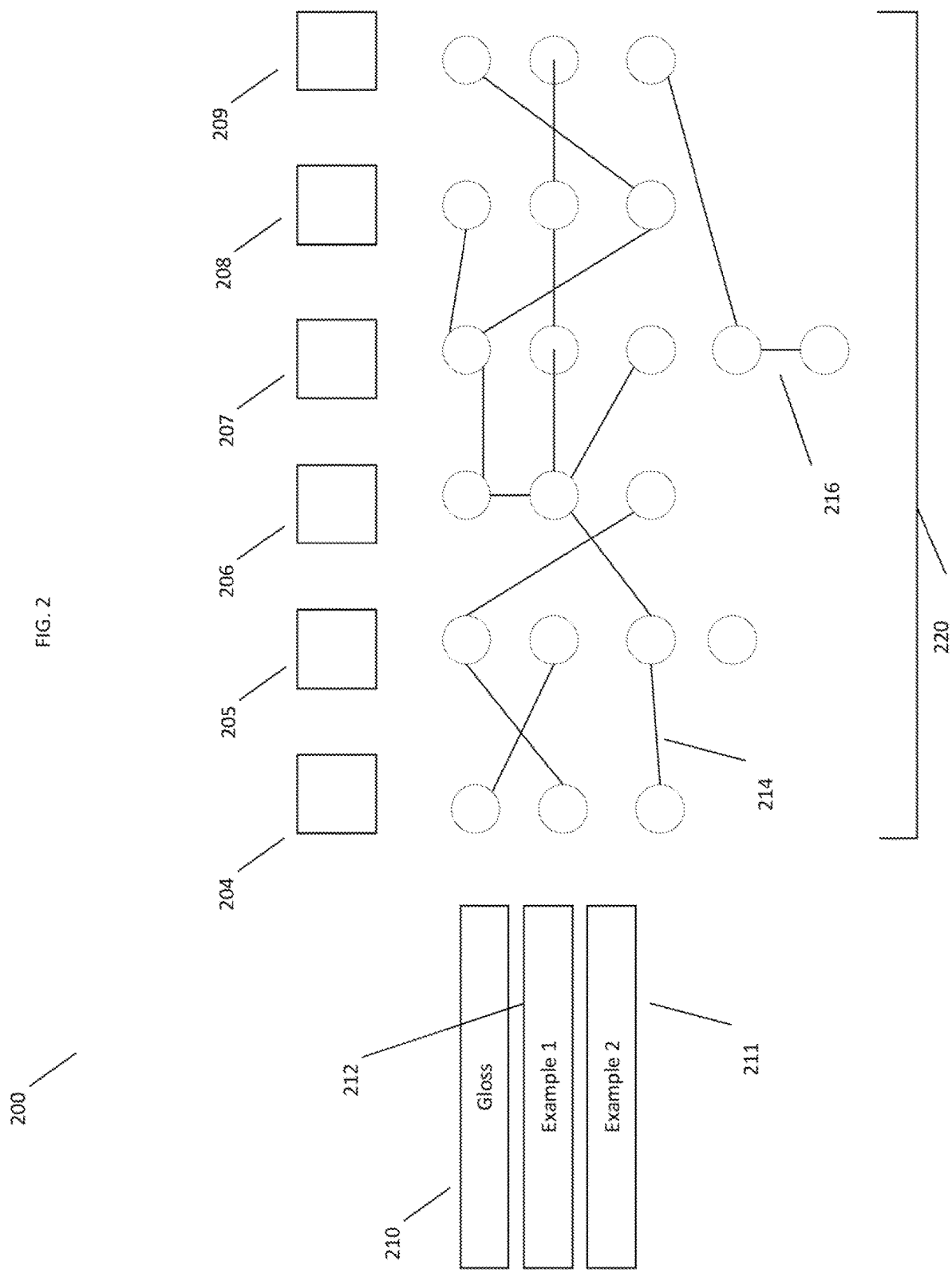
FIG. 2 is a simplified illustration of generation of an aligned gloss inventory according to the embodiments of the disclosure.

FIG. 2 is a simplified schematic 200 of an aligned word sense inventory. The aligned word sense inventories or simply aligned inventories, may include a best mapping or best matching alignment of glosses (210, 211, 212) from across a plurality of word sense inventories (204-209).

The word sense inventories (204-209) may be dictionaries that provide multiple example sentences for each word sense due to its usage and may be used as a means of receiving context sentences for that word sense. As an example, using dictionaries like Collins or Webster's Dictionary may provide an immense database of lexical knowledge in English.

Each of the word sense inventories (204-209) may have multiple examples or glosses for that word in a limited number of contexts. Thus, the glosses for a word's senses from the different word sense inventories (204-209) may be different expressions for the same meanings. Aligning par-

TABLE 2

| | | Dev | | | Test | | |
|---|---|---|---|---|---|---|---|
| Models | TS | Full Set | Few-shot | Zero-shot | Full Set | Few-shot | Zero-shot |
| 1 Most Frequent Sense | ✓ | 26.4 | 52.8 | 0.0 | 25.7 | 51.5 | 0.0 |
| 2 Lesk$_{emb}$ (Basile et al., 2014) | ✓ | 42.5 | 44.9 | 40.1 | 41.5 | 44.1 | 39.0 |
| 3 BEM(Blevins and Zettlemoyer, 2020) | ✓ | 73.8 | 79.3 | 68.3 | 72.8 | 79.1 | 66.5 |
| 4 BEM$_{SemCor}$ (Blevins et al., 2021) | ✓ | 74.4 | 79.7 | 69.0 | 73.0 | 78.9 | 67.1 |
| 5 SemEq-Base | ✓ | 73.5 | 78.7 | 68.3 | 72.4 | 78.5 | 66.3 |
| | | Ours: Data Augmentation | | | | | |
| 6 SemEq-Base (+WSI) | ✓ | 74.2 | 78.4 | 69.9 | 73.7 | 78.6 | 68.7 |
| | | Ours: Transfer Learning | | | | | |
| 7 SemEq-Base-General | — | 68.2 | 68.6 | 67.8 | 67.0 | 67.7 | 66.3 |
| 8 SemEq-Base-Expert | ✓ | 76.0 | 80.4 | 71.5 | 75.2 | 80.1 | 70.2 |
| 9 SemEq-Large-General | — | 70.7 | 70.9 | 70.5 | 69.8 | 71.2 | 68.4 |
| 10 SemEq-Large-Expert | ✓ | 77.8 | 81.8 | 73.7 | 77.3 | 82.3 | 72.2 |

Table 2 indicates the results on FEWS dataset. BEMSemCor (line 4) is a similar transfer learning model but fine-tuned on SemCor before training on FEWS while BEM (line 3) only trains on FEWS. The second section shows that augmenting the FEWS train set with multiple word sense allel glosses from the plurality of word sense inventories for the same word sense can significantly increase the lexical knowledge acquired by the model, especially for rare and infrequently used word senses.

To leverage this rich lexical and contextual information, the gloss alignment or alignment of inventories may include a best matching function (220) that includes a mapping of glosses (214, 216) of common words from one of the word sense inventories to the glosses of another one of the word sense inventories such that the mappings in the matching function may have maximum sentence textual similarity.

In some embodiments, the best matching function (220) may be determined using an optimization setup. In some embodiments, the optimization setup may be a Maximum Weighted Bipartite matching that aims to find a best matching in a weighted bipartite graph that maximizes the sum of the weights of the edges. As an example, in FIG. 2, the best matching function (220) may treat the mapping of glosses (214, 216) as weighted edges and the best matching function (220) may represent the function that maximizes the weights of the mappings of glosses. In some embodiments, the matching function (220) may be configured to maximize a sum of the sentence textual similarity between each gloss for a common word from the first word sense inventory (204-209) and each of the one or more associated glosses from the second word sense inventory (204-209).

An example setup of the Maximum Weighted Bipartite Matching optimization to obtain a best matching function for alignment of inventories may be as follows. Suppose we retrieve two word sets S1 and S2 from word sense inventory 204 and word sense inventory 205 respectively, where each word set consists of a list of definition sentences or glosses (210, 211, 212). To determine a best matching function (220) f: S1→S2, the reward function r: S1×S2→R may be maximized. In some embodiments, sentence level textual similarity or sentence textual similarity may be used as a reward function to measure the similarity between two glosses. In some embodiments, to measure or determine sentence level textual similarity between two glosses, a secondary pre-trained model may be used. The secondary pre-trained model may be any state-of-the-art model that may perform Semantic Textual Similarity (STS) tasks and paraphrase detection tasks. In some embodiments, a Sentence Bidirectional Encoder Representations from Transformers (SBERT) model may be used.

In some embodiments, determining a sentence textual similarity between glosses may include determining one or more sentence embeddings based on a secondary pre-trained model. In some embodiments, determining a sentence textual similarity between glosses may include determining a cosine similarity between the glosses based on the sentence textual similarity between the glosses. As an example, in some embodiments, the secondary pre-trained model (e.g., SBERT) may be applied to the word sets S1 and S2 to obtain sentence embeddings and calculate cosine similarity as a reward function.

In some embodiments, the Maximum Weighted Bipartite Matching optimization may be solved using Linear Programming. As an example, a Linear Programming based solution for the Maximum Weighted Bipartite Matching optimization may be as follows.

Suppose a weight $w_{ij}$ denotes the sentence textual similarity between the ith gloss in S1 and the jth gloss in S2. Aligning word sense inventories 204 and 205 may include solving the following linear integer programming problem:

$$\max_{\{x_{ij}\}} \sum_{(i,j) \in S_1 \times S_2} w_{ij} x_{ij}$$

$$\text{s.t.} \sum_{j \in S_2} x_{ij} = 1, i \in S_1$$

$$\sum_{i \in S_1} x_{ij} = 1, j \in S_2$$

$$x_{ij} \in \{0, 1\}, i \in S_1, j \in S_2$$

In some embodiments, S1 and S2 may include any of the word sense inventories (204-209). In some embodiments, S1 and S2 may include a combination of two out of the all the word sense inventories (204-209) and the aligning of the inventories may include aligning all the combinations of the word sense inventories (204-209). Thus, the alignment of inventories may provide a mapping of glosses across all of the word sense inventories (204-209).

Figure 3:
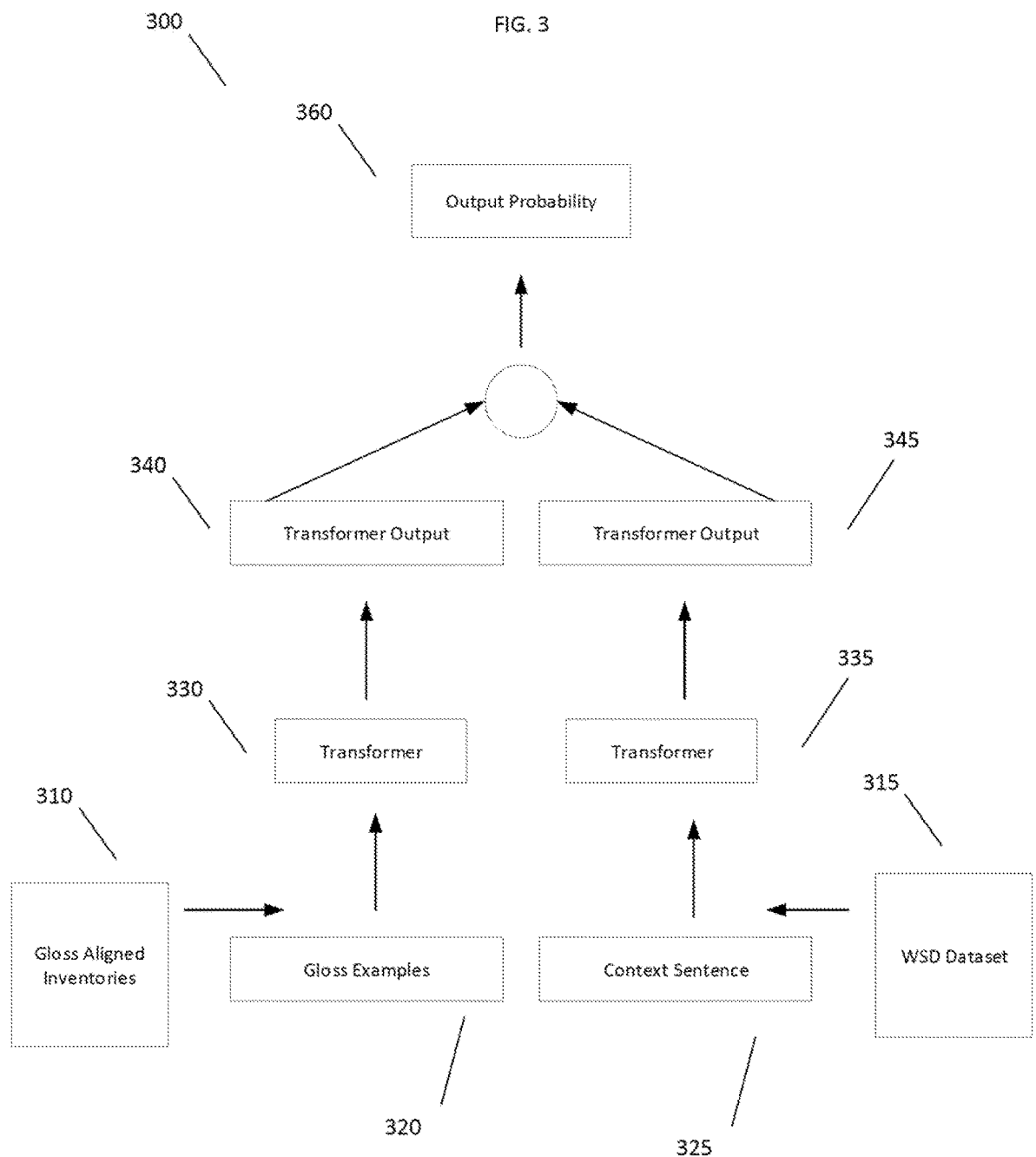
FIG. 3 is a simplified illustration of a word sense predicting model according to the embodiments of the disclosure.

FIG. 3 is an example semantic equivalence recognizer model (300) that predicts word sense according to the embodiments of the disclosure. The semantic equivalence recognizer model (300) may predict whether a word in the context sentence and a gloss are semantically equivalent or not. Thus, the semantic equivalence recognizer model (300) predicts the meaning of a word sense in the context sentence.

The gloss aligned inventories or aligned inventories (310) may include the mapping of glosses (214, 216) and the best matching function (220). The gloss examples (320) may include the mapping of glosses (214, 216) from the aligned inventories. The context sentence may include the sentence comprising the word for which the word sense may be predicted using the semantic equivalence recognizer model (300).

According to embodiments, the semantic equivalence recognizer model (300) may receive the gloss examples (320) from the gloss aligned inventories (310) as input for training the semantic equivalence recognizer model (300) or the transformers (330, 335). In some embodiments, the gloss examples (320) from the gloss aligned inventories (310) may be a pair of positive glosses wherein the pair of glosses are aligned. In some embodiments, the gloss examples (320) from the gloss aligned inventories (310) may be a pair of negative glosses wherein the pair of glosses are not aligned.

According to some embodiments, the semantic equivalence recognizer model (300) may include one or more transformers (330, 335) for predicting semantic equivalence between a word in context and any associated gloss. Transformers (330, 335) may be a deep learning model that includes encoders and decoders that can handle processing of input data, such as glosses in gloss examples (320) out of sequence using context for any position in the input sequence. In some embodiments, the transformers' (330, 335) may only include only encoders. In some embodiments, the transformers (330, 335) may be trained using only the gloss examples (320).

In some embodiments, the transformers (330, 335) and by extension the semantic equivalence recognizer model (300) may be trained using augmented training data. In the augmented training data, mapping of glosses (214, 216) may be combined with the built-in training data of specific word sense inventories like the WSD Dataset (315). Thus, using augmented training data, the semantic equivalence recognizer model (300) may be trained using both the aligned inventories and built-in training data for specific word sense inventories like the WSD Dataset (315) at the same time.

In some embodiments, the transformers (330, 335) are first trained using mapping of glosses (214, 216) such that the semantic equivalence recognizer model (300) may become a general model capable of determining whether a word in a context sentence and a gloss are semantically equivalent or not. However, such a model is general and may not predict meaning well for domain specific words. Thus, the transformers (330, 335), and by extension the semantic equivalence recognizer model (300) may be further trained or the model fine-tuned by connecting the output of the first trained model to an additional layer related with a specific word sense inventory like the WSD Dataset (315). This produces a semantic equivalence recognizer model (300) that is an expert in the domain of the specific word sense inventory like the WSD Dataset (315). In some embodiments, the specific word sense inventory used to fine-tune the trained model may be in a different domain than the word sense inventories used in the aligned inventories.

Once-trained, the transformers (330, 335) may determine a transformer output (340, 345) that may include dense representations of the input such as semantic representations of the input gloss examples (320) and context sentence (325). The semantic equivalence recognizer model (300), when applied to a context sentence (325), produces one or more output probabilities (360) for one or more glosses that whose meanings are semantically equivalent to the word in the context sentence. The semantic equivalence recognizer model (300) may select the gloss with the highest probability as the predicted word sense for the word in the context sentence.

Figure 4:
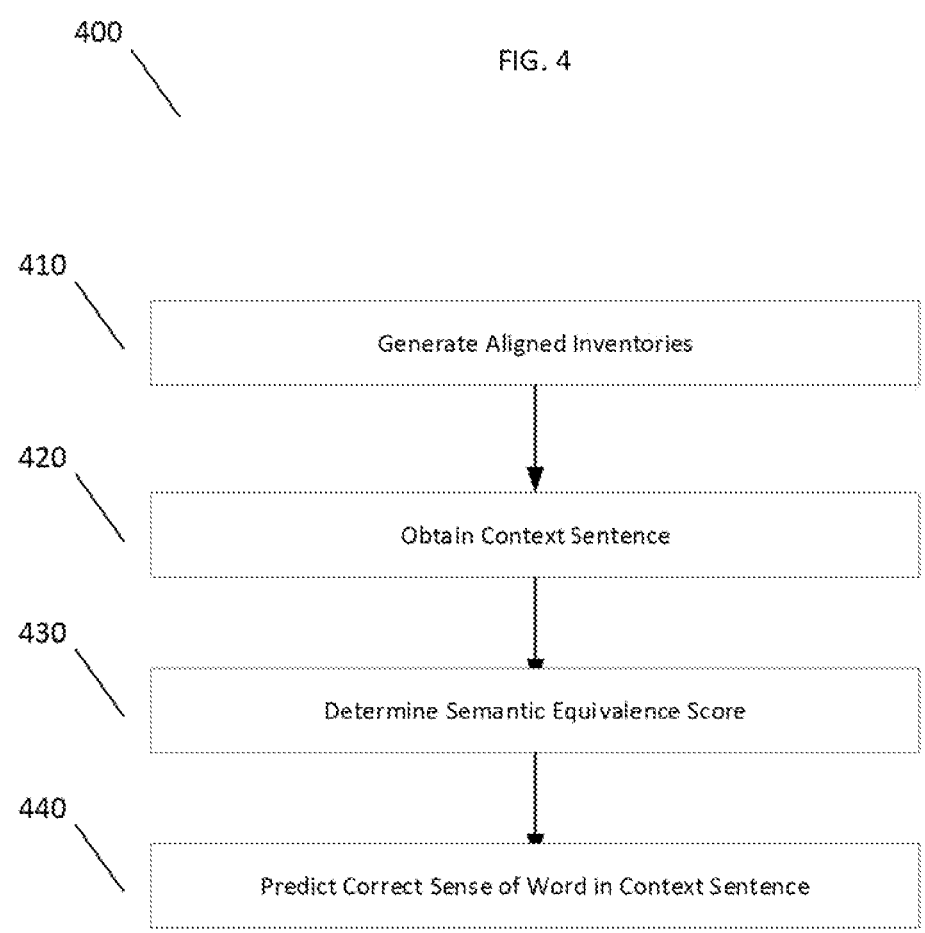
FIG. 4 is a simplified flowchart for a word sense predicting model according to the embodiments of the disclosure.

FIG. 4 is an exemplary flowchart for process 400 for a word sense predicting model according to the embodiments of the disclosure.

At 410, aligned inventories are generated using one or more word sense inventories. The gloss aligned inventories (310), may include a best mapping or best matching alignment of glosses from across the one or more word sense inventories. In some embodiments, the word sense inventories may be dictionaries that provide multiple example sentences for each word sense due to its usage and may be used as a means of receiving context sentences for that word sense. Each of the word sense inventories may have multiple examples or glosses for that word in a limited number of contexts. Thus, the glosses for a word's senses from the different word sense inventories may be different expressions for the same meanings. Aligning parallel glosses from the plurality of word sense inventories for the same word sense can significantly increase the lexical knowledge acquired by the model, especially for rare and infrequently used word senses.

At 420, a word in a context sentence may be obtained. The word in the context sentence may be the word whose meaning or word sense the model may predict. In some embodiments, the entire context sentence may be obtained.

At 430, one or more semantic equivalence scores may be determined, wherein the one or more semantic equivalence scores indicate semantic similarity between the word in the context sentence and each of one or more associated glosses in the one or more aligned inventories using a semantic equivalence recognizer model. As an example, the semantic equivalence recognizer model (300) may generate an output probability score indicating the semantic similarity between the word in the context sentence and the each of the one or more associated glosses in the one or more aligned inventories.

At 440, a prediction for the correct sense of the word in the context sentence may be based on the determined one or more semantic equivalence scores. In some embodiments, predicting the correct sense of the word in the context sentence based on the determined one or more semantic equivalence scores may include selecting a result gloss associated with a highest semantic equivalence score. As an example, the gloss with the highest probability from the output probability generated by the semantic equivalence recognizer model (300) may be selected as the predicted correct sense of the word in the context sentence.

Figure 5:
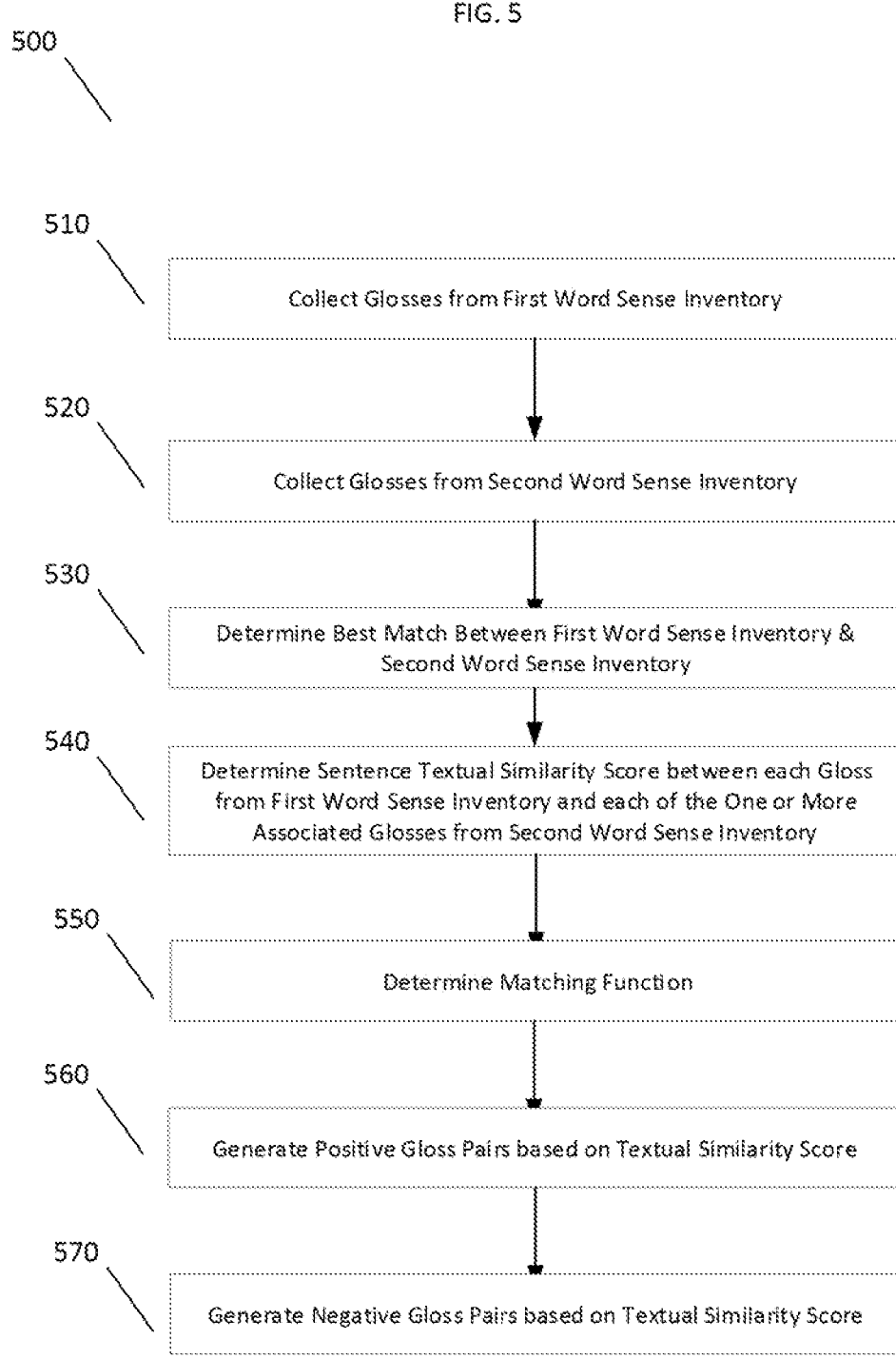
FIG. 5 is a simplified flowchart for a word sense predicting model according to the embodiments of the disclosure.

FIG. 5 is an exemplary flowchart for process 500 for a word sense predicting model according to the embodiments of the disclosure wherein process 500 illustrates an example process for generating one or more aligned inventories.

At 510, glosses from a first word sense inventory may be collected. As an example, at 510, glosses from word sense inventories (204-209) like dictionaries may be collected.

At 520, glosses from a second word sense inventory may be collected. As an example, at 520, glosses from word sense inventories (204-209) like dictionaries may be collected. In some embodiments, the first word sense inventory and the second word sense inventory may be different.

At 530, a best match between the first word sense inventory and the second word sense inventory may be determined. As an example, a best matching function (220) may be generated to indicate a mapping of glosses (214, 216) of common words from one of the word sense inventories to the glosses of another one of the word sense inventories. In some embodiments, the mappings in the matching function may be generated as a function maximizing the sentence textual similarity.

At 540, a sentence textual similarity score between each gloss from the first word sense inventory and each of one or more associated glosses from the second word sense inventory may be determined for each common word in the first word sense inventory and the second word sense inventory. In some embodiments, determining the sentence textual similarity score between the each gloss from the first word sense inventory and the each of the one or more associated glosses from the second word sense inventory may include determining one or more sentence embeddings based on a secondary pre-trained model. In some embodiments, determining the sentence textual similarity score between the each gloss from the first word sense inventory and the each of the one or more associated glosses from the second word sense inventory may include determining a cosine similarity between the each gloss from the first word sense inventory and the each of the one or more associated glosses from the second word sense inventory based on the one or more sentence embeddings.

At 550, a matching function may be determined. The mapping function may map the each gloss from the first word sense inventory to the each of the one or more associated glosses from the second word sense inventory, wherein the matching function may be configured to maximize a sum of the sentence textual similarity score between the each gloss from the first word sense inventory and the each of the one or more associated glosses from the second word sense inventory. As an example, the best matching function (220) may be configured to maximize the sum sentence textual similarity score between the each gloss from the first word sense inventory (204) and the each of the one or more associated glosses from the second word sense inventory (205). As another example, the best matching function (220) may be configured to generate a mapping such that the total sentence textual similarity score may be maximized.

At 560, positive gloss pairs may be generated. In some embodiments, positive gloss pairs may be generated by pairing a gloss from the first word sense inventory with the each of the one or more associated glosses from the second word sense inventory based on determining that the sentence textual similarity score between the gloss from the first word sense inventory and the each of the one or more associated glosses from the second word sense inventory is above a threshold.

At 570, negative gloss pairs may be generated. In some embodiments, negative gloss pairs are generated by pairing a gloss from the first word sense inventory with the each of the one or more associated glosses from the second word sense inventory based on determining that the sentence textual similarity score between the gloss from the first word sense inventory and the each of the one or more associated glosses from the second word sense inventory is below a threshold.

Figure 6:
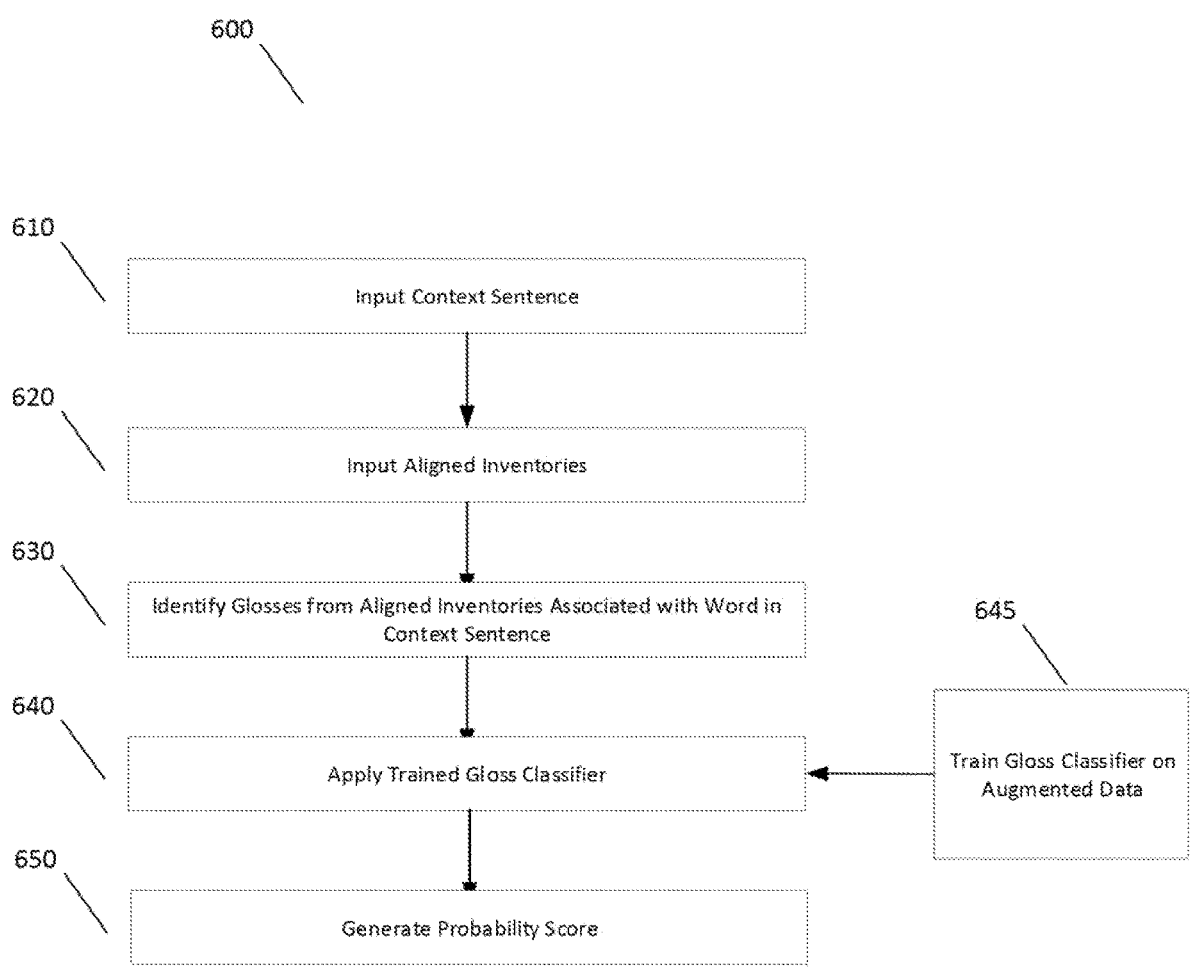
FIG. 6 is a simplified flowchart for a word sense predicting model according to the embodiments of the disclosure.

FIG. 6 is an exemplary flowchart for process 600 for a word sense predicting model according to the embodiments of the disclosure wherein process 600 illustrates an exemplary process for determining semantic equivalence scores indicating the semantic similarity.

At 610, the context sentence may be input into the semantic equivalence recognizer model. At 620, the pairs of glosses from the aligned inventories may be input into the semantic equivalence recognizer model. As an example, all the positive and negative pairs of glosses from the gloss aligned inventories (310) and the context sentence containing the word the sense of which is to be predicted may be input into the semantic equivalence recognizer model (300).

At 630, one or more glosses from the one or more aligned inventories associated with the word in the context sentence may be identified. In some embodiments, the glosses associated with the word the context sentence whose meaning or sense is to be predicted are identified.

At 640, the trained gloss classifier may be applied to the identified one or more glosses to generate a probability score for each of the identified one or more glosses at 650.

In some embodiments, at 645, the gloss classifier may be trained using an augmented training data, wherein the augmented training data may be a combination of the one or more aligned inventories and built-in training data associated with a specific word sense inventory. As an example, the semantic equivalence recognizer model (300) may be trained using augmented training data. In the augmented training data, mapping of glosses (214, 216) may be combined with the built-in training data of specific word sense inventories like the WSD Dataset (315). Thus, using augmented training data, the semantic equivalence recognizer model (300) may be trained using both the aligned inventories and built-in training data for specific word sense inventories like the WSD Dataset (315) at the same time.

Figure 7:
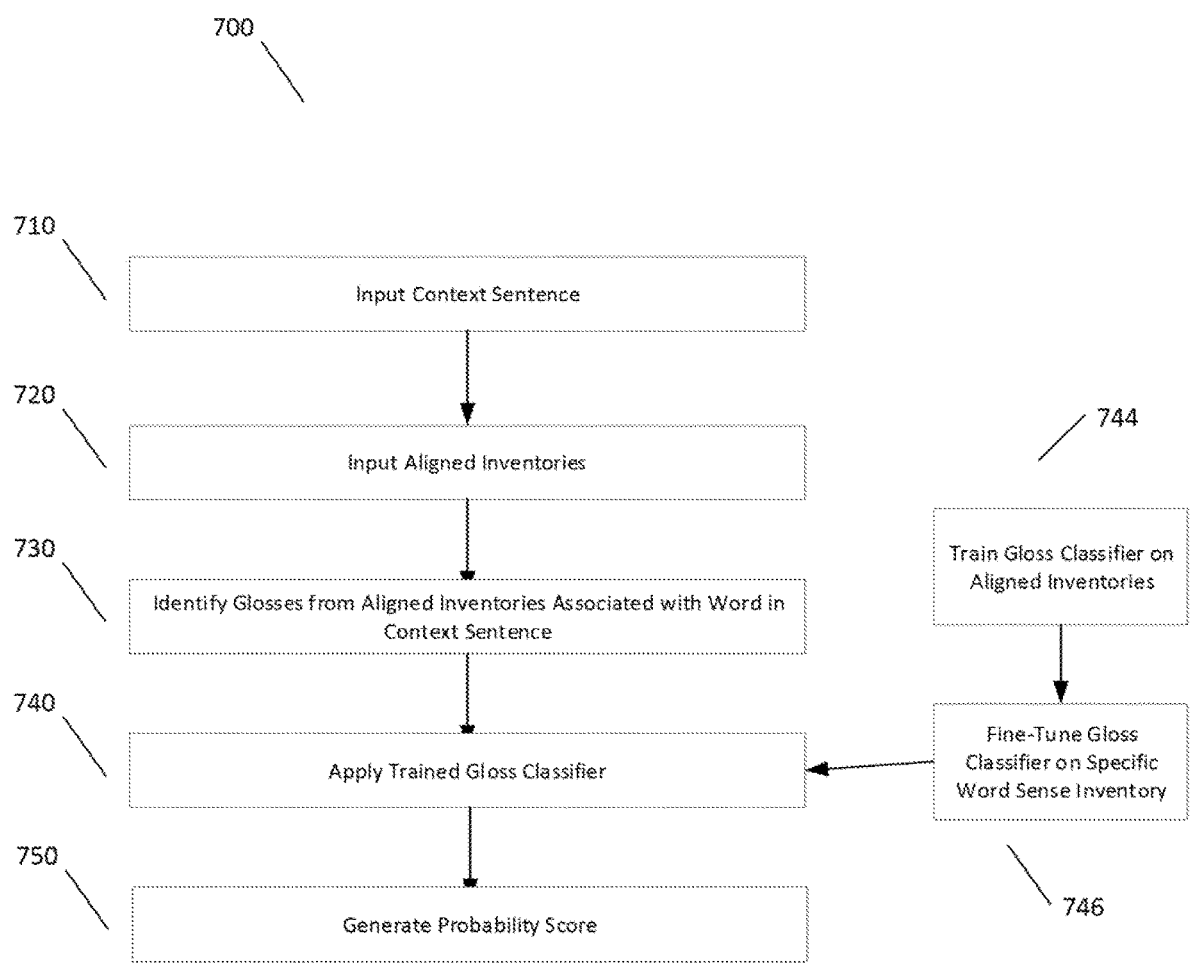
FIG. 7 is a simplified flowchart for a word sense predicting model according to the embodiments of the disclosure.

FIG. 7 is an exemplary flowchart for process 700 for a word sense predicting model according to the embodiments of the disclosure wherein process 700 illustrates an exemplary process for determining semantic equivalence scores indicating the semantic similarity.

At 710, the context sentence may be input into the semantic equivalence recognizer model. At 720, the pairs of glosses from the aligned inventories may be input into the semantic equivalence recognizer model. As an example, all the positive and negative pairs of glosses from the gloss aligned inventories (310) and the context sentence containing the word the sense of which is to be predicted may be input into the semantic equivalence recognizer model (300).

At 730, one or more glosses from the one or more aligned inventories associated with the word in the context sentence may be identified. In some embodiments, the glosses associated with the word the context sentence whose meaning or sense is to be predicted are identified.

At 740, the trained gloss classifier may be applied to the identified one or more glosses to generate a probability score for each of the identified one or more glosses at 750.

In some embodiments, the trained gloss classifier may be trained using the one or more aligned inventories at 744. In some embodiments, at 746, the trained gloss classifier may be fine-tuned using built-in training data associated with a specific word sense inventory in a new domain. As an example, the semantic equivalence recognizer model (300) may be first trained using mapping of glosses (214, 216) such that the semantic equivalence recognizer model (300) may become a general model capable of determining whether a word in a context sentence and a gloss are semantically equivalent or not. In some embodiments, the semantic equivalence recognizer model (300) may be further trained or the semantic equivalence recognizer model (300) may be further fine-tuned by connecting the output of the first trained model to an additional layer related with a specific word sense inventory like the WSD Dataset (315). This may produce a semantic equivalence recognizer model (300) that is an expert in the domain of the specific word sense inventory like the WSD Dataset (315). In some embodiments, the specific word sense inventory used to fine-tune the trained model may be in a different domain than the word sense inventories used in the aligned inventories.

Although FIGS. 4-7 show example blocks of the processes 400, 500, 600, and 700, in embodiments, the processes 400, 500, 600, and 700 may include additional blocks, fewer blocks, different blocks, or differently arranged blocks than those depicted in FIGS. 4-7. In embodiments, any blocks of processes 400, 500, 600, and 700 may be combined or arranged in any amount or order, as desired. In embodiments, two or more of the blocks of the processes 400, 500, 600, and 700 may be performed in parallel.

The techniques described above, can be implemented as computer software using computer-readable instructions and physically stored in one or more computer-readable media or by a specifically configured one or more hardware processors. For example, FIG. 10 shows a computer system 1000 suitable for implementing various embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for predicting a word sense, the method comprising:
   obtaining a first aligned inventory, wherein the first aligned inventory are generated based on a first sentence textual similarity score between first definition sentences and first example sentences among one or more word sense inventories, wherein the first aligned inventory comprises first positive gloss-context pairs and first negative gloss-context pairs, wherein a first positive gloss-context pair comprises a definition sentence and an example sentence that have a same meaning, and wherein a first negative gloss-context pair comprises the definition sentence and the example sentence that have a different meaning;
   obtaining a second aligned inventory, wherein the second aligned inventory is generated based on a second sentence textual similarity score between second definition sentences and second example sentences among the one or more word sense inventories, wherein the second aligned inventory comprises second positive gloss-context pairs and second negative gloss-context pairs, wherein a second positive gloss-context pair comprises a second definition sentence and a second example sentence that have the same meaning, and wherein a second negative gloss-context pair comprises the second definition sentence and the second example sentence that have the different meaning;
   obtaining a word in a context sentence;
   determining a semantic representation of the word in the context sentence;
   determining one or more semantic equivalence scores indicating semantic similarity between the semantic representation of the word in the context sentence and a semantic representation of each positive gloss-context pair associated with the word, a semantic representation of each negative gloss-context pair associated with the word, a semantic representation of each second positive gloss-context pair associated with the word, a semantic representation of each second negative gloss-context pair associated with the word using a trained semantic equivalence recognizer model,
      wherein the trained semantic equivalence recognizer model is trained using the first aligned inventory and the second aligned inventory; and
   predicting a correct sense of the word in the context sentence based on the one or more semantic equivalence scores.

2. The method of claim 1, wherein the generating of the first aligned inventory comprises:
   collecting glosses from a first word sense inventory;
   collecting glosses from a second word sense inventory;
   determining a best match between the first word sense inventory and the second word sense inventory, wherein the determining of the best match between the first word sense inventory and the second word sense inventory comprises:
      for each common word in the first word sense inventory and the second word sense inventory, determining the first sentence textual similarity score between each gloss from the first word sense inventory and each of one or more associated glosses from the second word sense inventory; and
      determining a matching function to map the each gloss from the first word sense inventory to the each of the one or more associated glosses from the second word sense inventory, wherein the matching function is configured to maximize a sum of the first sentence textual similarity score between the each gloss from the first word sense inventory and the each of the one or more associated glosses from the second word sense inventory;
   generating the first positive gloss-context pairs based on the matching function; and
   generating the first negative gloss-context pairs based on the matching function.

3. The method of claim 2, wherein determining the first sentence textual similarity score between the each gloss from the first word sense inventory and the each of the one or more associated glosses from the second word sense inventory comprises:
   determining one or more sentence embeddings based on a secondary pre-trained model; and
   determining a cosine similarity between the each gloss from the first word sense inventory and the each of the one or more associated glosses from the second word sense inventory based on the one or more sentence embeddings.

4. The method of claim 3, wherein the secondary pre-trained model includes a Sentence Bidirectional Encoder Representations from Transformers (SBERT) model.

5. The method of claim 1, wherein the determining of the one or more semantic equivalence scores further comprises:
   inputting the word in the context sentence into the trained semantic equivalence recognizer model; and
   inputting the first aligned inventory and the second aligned inventory into the trained semantic equivalence recognizer model.

6. The method of claim 5, wherein the trained semantic equivalence recognizer model is trained using an augmented training data, wherein the augmented training data is a combination of the first aligned inventory and built-in training data associated with the second aligned inventory.

7. The method of claim 1, wherein the one or more word sense inventories is a lexical dataset for a language.

8. The method of claim 1, wherein the predicting of the correct sense of the word in the context sentence based on the one or more semantic equivalence scores comprises selecting a result gloss associated with a highest semantic equivalence score.

9. An apparatus for predicting a word sense, the apparatus comprising:
   at least one memory configured to store program code; and
   at least one processor configured to read the program code and operate a instructed by the program code, the program code including:
      first generating code configured to cause the at least one processor to obtain first aligned inventory, wherein the first aligned inventory are generated based on a first sentence textual similarity score between first definition sentences and first example sentences among one or more word sense inventories, wherein first aligned inventory comprises first positive gloss-context pairs and first negative gloss-context pairs, wherein a first positive gloss-context pair comprises a definition sentence and an example sentence that have a same meaning, and wherein a first negative gloss-context pair comprises the definition sentence and the example sentence that have a different meaning;
      domain aligned inventory generation code configured to cause the at least one processor to obtain a second aligned inventory, wherein the second aligned inventory is generated based on a second sentence textual similarity score between second definition sentences and second example sentences among the one or more word sense inventories, wherein the second aligned inventory comprises second positive gloss-context pairs and second negative gloss-context pairs, wherein a second positive gloss-context pair comprises a second definition sentence and a second example sentence that have the same meaning, and wherein a second negative gloss-context pair comprises the second definition sentence and the second example sentence that have the different meaning;

first obtaining code configured to cause the at least one processor to obtain a word in a context sentence and determine a semantic representation of the word in the context sentence;

first determining code configured to cause the at least one processor to determine one or more semantic equivalence scores indicating semantic similarity between the semantic representation of the word in the context sentence and a semantic representation of each positive gloss-context pair associated with the word, a semantic representation of each negative gloss-context pair associated with the word, a semantic representation of each second positive gloss-context pair associated with the word, a semantic representation of each domain second negative gloss-context pair associated with the word using a trained semantic equivalence recognizer model, wherein the trained semantic equivalence recognizer model is trained using the first aligned inventory and the second aligned inventory; and first predicting code configured to cause the at least one processor to predict a correct sense of the word in the context sentence based on the one or more semantic equivalence scores.

10. The apparatus of claim 9, wherein the first generating code further comprises:

first collecting code configured to cause the at least one processor to collect glosses from a first word sense inventory;

second collecting code configured to cause the at least one processor to collect glosses from a second word sense inventory;

second determining code configured to cause the at least one processor to determine a best match between the first word sense inventory and the second word sense inventory, the second determining code further comprising:

third determining code configured to cause the at least one processor to determine, for each common word in the first word sense inventory and the second word sense inventory, the first sentence textual similarity score between each gloss from the first word sense inventory and each of one or more associated glosses from the second word sense inventory; and forth determining code configured to cause the at least one processor to determine a matching function to map the each gloss from the first word sense inventory to the each of the one or more associated glosses from the second word sense inventory, wherein the matching function is configured to maximize a sum of the first sentence textual similarity score between the each gloss from the first word sense inventory and the each of the one or more associated glosses from the second word sense inventory;

second generating code configured to cause the at least one processor to generate the first positive gloss-context pairs based on the matching function; and third generating code configured to cause the at least one processor to generate the second negative gloss-context pairs based on the matching function.

11. The apparatus of claim 10, wherein the third determining code further comprises:

fifth determining code configured to cause the at least one processor to determine one or more sentence embeddings based on a secondary pre-trained model; and sixth determining code configured to cause the at least one processor to determine a cosine similarity between the each gloss from the first word sense inventory and the each of the one or more associated glosses from the second word sense inventory based on the one or more sentence embeddings.

12. The apparatus of claim 9, wherein the first determining code further comprises:

first inputting code configured to cause the at least one processor to input the word in the context sentence into the trained semantic equivalence recognizer model; and second inputting code configured to cause the at least one processor to input the first aligned inventory and the second aligned inventory into the trained semantic equivalence recognizer model.

13. The apparatus of claim 12, wherein the trained semantic equivalence recognizer model is trained using an augmented training data, wherein the augmented training data is a combination of the first aligned inventory and built-in training data associated with the second aligned inventory.

14. The apparatus of claim 9, wherein the one or more word sense inventories is a lexical dataset for a language.

15. The apparatus of claim 9, wherein the first predicting code further comprises first selecting code configured to cause the at least one processor to select a result gloss associated with a highest semantic equivalence score.

16. A non-transitory computer-readable medium storing instructions, the instructions comprising: one or more instructions that, when executed by one or more processors of a device predict a word sense, cause the one or more processors to:

obtain first aligned inventory, wherein the first aligned inventory are generated based on a first sentence textual similarity score between first definition sentences and first example sentences among one or more word sense inventories, wherein the first aligned inventory comprises first positive gloss-context pairs and first negative gloss-context pairs, wherein a first positive gloss-context pair comprises a definition sentence and an example sentence that have a same meaning, and wherein a first negative gloss-context pair comprises the definition sentence and the example sentence that have a different meaning;

obtain a second aligned inventory, wherein the second aligned inventory is generated based on a second sentence textual similarity score between second definition sentences and second example sentences among the one or more word sense inventories, wherein the second aligned inventory comprises second positive gloss-context pairs and second negative gloss-context pairs, wherein a second positive gloss-context pair comprises a second definition sentence and a second example sentence that have the same meaning, and wherein a second negative gloss-context pair comprises the second definition sentence and the second example sentence that have the different m;

obtain a word in a context sentence;
determine a semantic representation of the word in the context sentence;
determine one or more semantic equivalence scores indicating semantic similarity between the semantic representation of the word in the context sentence and a semantic representation of each positive gloss-context pair associated with the word, a semantic representation of each negative gloss-context pair associated with the word, a semantic representation of each second positive gloss-context pair associated with the word, a semantic representation of each second negative gloss-context pair associated with the word using a trained semantic equivalence recognizer model,
  wherein the trained semantic equivalence recognizer model is trained using the first aligned inventory and the second aligned inventory; and
  predict a correct sense of the word in the context sentence based on the one or more semantic equivalence scores.

17. The non-transitory computer-readable medium of claim 16, wherein the generating of the first aligned inventory further causes the one or more processors to:
collect glosses from a first word sense inventory;
collect glosses from a second word sense inventory;
determine a best match between the first word sense inventory and the second word sense inventory, wherein the determining of the best match between the first word sense inventory and the second word sense inventory comprises:
  for each common word in the first word sense inventory and the second word sense inventory, determine the first sentence textual similarity score between each gloss from the first word sense inventory and each of one or more associated glosses from the second word sense inventory; and
  determine a matching function to map the each gloss from the first word sense inventory to the each of the one or more associated glosses from the second word sense inventory, wherein the matching function is configured to maximize a sum of the first sentence textual similarity score between the each gloss from the first word sense inventory and the each of the one or more associated glosses from the second word sense inventory;
generate first positive gloss-context pairs based on the matching function; and
generate first negative gloss-context pairs based on the matching function.

18. The non-transitory computer-readable medium of claim 16, wherein the determining of the one or more semantic equivalence scores causes the one or more processors to:
input the word in the context sentence into the trained semantic equivalence recognizer model; and
input the first aligned inventory and the second aligned inventory into the trained semantic equivalence recognizer model.

* * * * *